Figure 1:
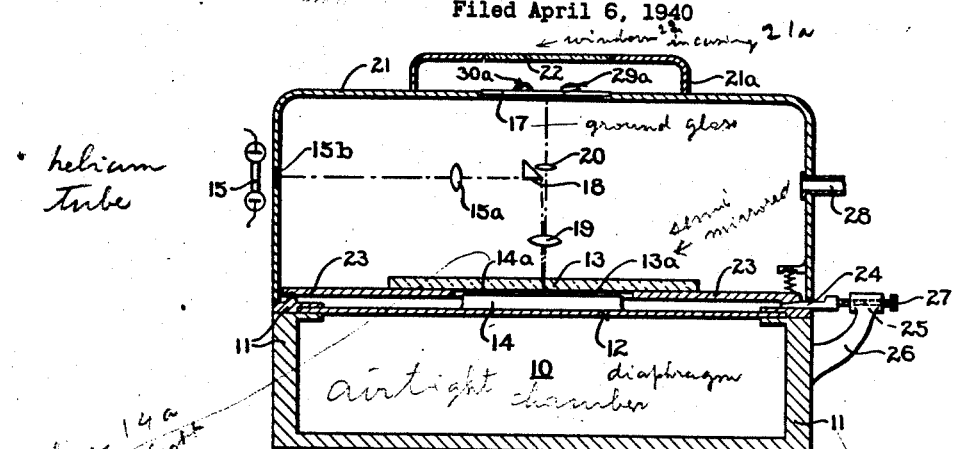

Nov. 5, 1946.                 R. T. HURLEY                 2,410,502
                       AIRCRAFT CONTROL APPARATUS
                          Filed April 6, 1940

INVENTOR
Roy T. Hurley
BY F. Bascom Smith
ATTORNEY

Patented Nov. 5, 1946

2,410,502

UNITED STATES PATENT OFFICE 2,410,502

AIRCRAFT CONTROL APPARATUS

Roy T. Hurley, Dobbs Ferry, N. Y., assignor to Bendix Aviation Corporation, South Bend, Ind., a corporation of Delaware Application April 6, 1940, Serial No. 328,213

15 Claims. (Cl. 172—282)

1

This invention relates to control apparatus, and more particularly to apparatus for automatically controlling the direction of flight of an aircraft.

The use of gyroscopic means to provide a reference whereby an aircraft is automatically controlled in its longitudinal flight has proved unsatisfactory on modern, long-range and high-speed transports and bombs. An aircraft equipped with a gyro pilot will successively ascend and descend when guided by the gyro pilot, and although the mean line of flight may be horizontal, the aircraft is actually never flying in a horizontal line but is either climbing or gliding and travels a substantially greater distance than it would in true level flight. This decreases the efficiency of operation of the aircraft when the latter is being flown automatically, and additionally renders the automatic gyro pilot substantially useless for bombing purposes since it is important for accurate bombing to set the bomb sights and release the bombs when the aircraft is in level flight.

Accordingly, it is an object of this invention to provide a novel method and novel control apparatus for carrying out said method whereby an aircraft can be automatically maintained in a line of flight substantially parallel to the earth's surface.

A further object of the invention is to provide novel control means operable in aircraft to rapidly and accurately register deviations of said aircraft from a predetermined level line of flight.

Another object is to provide novel means for responding to movements of a sensitive pressure actuated device in an aircraft, said means being adapted to accurately transmit and amplify said movements.

A still further object is to provide an aircraft with novel interferometric means for responding to changes in altitude of said aircraft from a constant pressure level, and to combine light responsive means in a novel manner with said interferometric means to operate control apparatus in accordance with said altitude changes.

Still another object is to provide novel means whereby an aircraft can be flown at an altitude level having a constant pressure.

A still further object of the invention is to provide automatic means for controlling the longitudinal course of flight of an aircraft, said means requiring no adjustment by the human pilot once the course has been set.

The above and other objects and novel features of this invention will more fully appear when the same is read in connection with the accompanying drawing. It is to be expressly understood, however, that the drawing is for the purpose of illustration only and is not intended as a definition of the limits of the invention, reference for this latter purpose being had to the appended claims.

Figure 2:
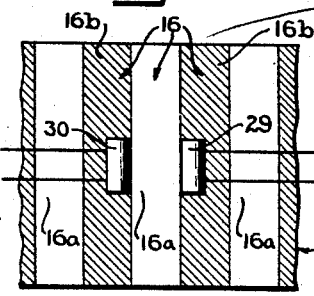
Figure 3:
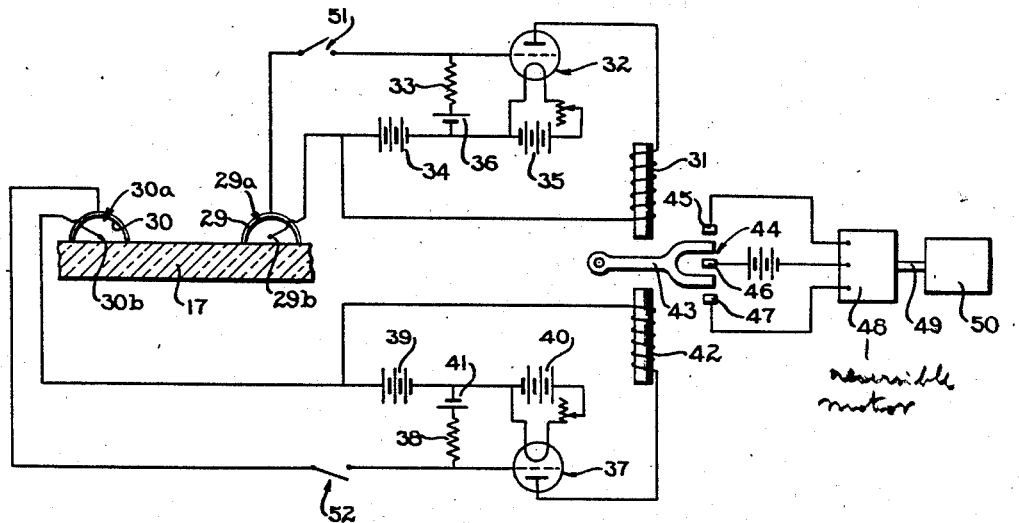

In the drawing, wherein like reference characters refer to like parts throughout the several views, Fig. 1 is a sectional view illustrating somewhat diagrammatically a form of apparatus adapted to respond to pressure changes;

Fig. 2 is a top plan view with parts broken away of a part of the mechanism shown in Fig. 1; and Fig. 3 is a schematic diagram of a form of electrical circuit adapted to actuate control apparatus in accordance with the present invention and the manner in which said circuit is operatively connected to the apparatus of Fig. 1.

In the present invention there is provided novel automatic aircraft control means, said means being actuated by changes in the pressure of the medium surrounding the aircraft and, in turn, being adapted to actuate the aircraft controls to maintain said aircraft at a constant pressure level. As shown, the invention comprises a pressure responsive device 10, having an airtight evacuated chamber or enclosure constituted by a casing 11 and a resilient member, such as a diaphragm 12, said diaphragm being moved by changes in atmospheric pressure in accordance with the magitude of said changes.

The movement of diaphragm 12 is measured by novel interferometric means, preferably using a modification of the Pulfrich-Fizeau optical arrangement for creating interference fringes, said means comprising a plate 13 adapted to transmit light therethrough, and a plate or element 14 having upper surface 14a thereof inclined relative to plate 13 at a very small angle of inclination, for example, two seconds. Surface 14a is preferably polished or otherwise mirrored to reflect light, and lower surface 13a of plate 13 is semi-mirrored to reflect part of the light passing through plate 13 and to permit the remainder to strike surface 14a. In addition, it is desirable that plate 13 be polished with a slight angle of approximately twenty minutes between the upper and lower surfaces thereof in order that the reflection from the upper surface will be thrown to one side and lost. A beam of light, preferably from a source of substantially monochromatic light, such as a helium-filled discharge tube 15, is directed on plate 13 and is divided and recombined at surface 13a, part of the beam passing through said plate to be reflected back by surface 14a of element 14, and the remainder of said beam being reflected by surface 13a. The recombined beam is in a condition to produce a series of interference fringes 16 when properly focused, for example, on a ground glass plate 17 (Fig. 2).

The optical means for directing the beam of light from source 15 on plates 13 and 14 and for focusing the recombined beam on plate 17 comprise a condenser lens 15a through which the beam of light passes, being directed by said lens on a prism 18. The beam is reflected by said prism in a direction substantially perpendicular to the original course thereof through a collimator objective lens 19 and onto plate 13. The beam of light is thereafter divided and recombined by means of plates 13 and 14 and then returned through lens 19 past the edge of prism 18 and is focused by objective lens 20 on ground glass plate 17, said beam being visible as a fringe pattern comprised of alternate dark and light fringes 16a and 16b, respectively.

A casing or cover plate 21 encloses the optical system comprising lenses 15a, 19 and 20, and prism 18, and ground glass plate 17 is preferably mounted in the upper wall of said casing. A second casing 21a covering plate 17 may be provided and is carried by casing 21, fringes 16 on plate 17 being visible through a window 22 in casing 21a. An opening or window 15b is also provided in casing 21 so that the light from lamp 15 can be directed from the exterior of said casing onto prism 18.

The location of the fringe pattern in relation to plate 17 depends on the distance between surface 13a of plate 13 and reflecting surface 14a so that movement of element 14, for example, relative to plate 13 displaces the fringe pattern an amount corresponding to the degree of movement of said element. Accordingly, element 14 is mounted on diaphragm 12 and plate 13 is preferably carried by a bracket 23, and the latter is pivotally mounted on casing 11 so that said plate is held at a predetermined angle to surface 14a of element 14, the angle between said surface and plate being controlled by suitable means, such as a wedge member 24 interposed between bracket 23 and casing 11. Wedge member 24 is moved by means of a threaded member 25 rotatably mounted in a bracket 26 formed with or attached to casing 11. Rotation of said threaded member, by means of a knob 27, produces translatory motion of said wedge member. One or more passages 28 may be provided in casing 21 to connect the interior of said casing to the source of pressure being measured by the movement of diaphragm 12.

The interferometric means are capable of accurately amplifying the movement of diaphragm 12 as much as 100,000 times without introducing any lag or lost motion and without placing any load on the diaphragm. Accordingly, the latter is of a considerably stiffer construction than are the diaphragms heretofore utilized in pressure measuring devices having mechanical amplifying means. As a result of the increased stiffness, and the absence of mechanical friction load, the hysteresis due to repeated movement of the diaphragm is minimized so as to be substantially negligible and the accuracy of the measurements is correspondingly increased.

It is satisfactory to have diaphragm 12 of a sufficient thickness relative to the diameter thereof and constructed from a suitable material so that a deflection of not more than .025 inch will be imparted thereto by a pressure variation equivalent to 25 inches of mercury. The selection of the exact diaphragm stiffness within this limit depends on the fringe movement, measured in fringes, which it is desired to produce for a given pressure change. The term "stiff diaphragm," as hereafter employed, is to be understood as designating a diaphragm having the above-described characteristics.

Diaphragm 12 is preferably selected to be sufficiently stiff to produce a deflection of approximately .018 inch for a pressure change equivalent to 29 inches of mercury in which event a pressure change equivalent to .02 inch of mercury will displace the fringe pattern a distance equal to the width of a single fringe. In atmospheric conditions permitting the use of automatic pilots, a sudden altitude deviation equivalent to .01 inch of mercury is rarely produced in an aircraft so that the maximum displacement of the fringe pattern is less than one-half the width of a fringe when the pressure measuring device is used, as hereafter described, to control the flight level of an aircraft. It is to be noted that although the diaphragm stiffness controls the fringe displacement measured in fringes, the lens arrangement of the interferometric means and the angularity between plates 13 and 14 determines the width of the fringes.

Means sensitive to light are combined in a novel manner with the interferometric means for the purpose of responding almost instantaneously to movements of the interferometric fringes and for controlling the operation of power means in accordance with the amount of said movement. As shown, said light sensitive means comprise a pair of plates 29 and 30, preferably of a material sensitive to light, said plates being adapted to constitute the cathodes of photo-electric cells 29a and 30a (Fig. 3), respectively, having anodes 29b and 30b suitably located relative to said plates. Sensitive plates 29 and 30 are preferably mounted on plate 17, being spaced apart a distance substantially equal to the width of a single interference fringe 16. The length of each of said light sensitive plates in the direction in which interference fringes 16 are adapted to move is preferably equal to or less than one-half the width of a single fringe.

When one of light fringes 16a falls on plate 29, for example, photo-electric cell 29a is energized and is adapted to actuate a relay 31 connected by means of a suitable amplifying circuit to said cell. The circuit shown, by way of example, in Fig. 3 is of the type comprising a thermionic valve 32, having the grid thereof connected to cathode 29, a resistance 33 and, preferably, three separate sources 34, 35 and 36 of direct current electrical energy. A similar circuit comprising a thermionic tube 37, a resistance 38 and energy sources 39, 40 and 41, is connected to photo-electric cell 30a for the purpose of actuating a relay 42 when light strikes cathode 30 of said cell. Relays 31 and 42 have a common armature 43 adapted to be moved from the central position thereof, shown in Fig. 3, in either direction, depending on which of said relays is energized. Armature 43 actuates a single pole double throw switch 44 to close a circuit through contacts 45 and 46 or 46 and 47 to a reversible motor 48. The latter is drivably connected by a shaft 49 with a unit 50 which is a steering motor or other control device connected to the control surface governing the longitudinal flight of the aircraft.

The present invention is mounted in an aircraft (not shown) and when the aircraft is flying at a desired altitude, the pilot by adjustment of knob 27 varies the angularity between plate 13 and the mirrored surface 14a and is thereby able to control the position of the fringe pattern so that a light fringe 16a can be centrally located between light sensitive plates 29 and 30 with a dark fringe 16b beneath each of said plates. The automatic longitudinal control means can then be set in operation by closing master switches 51 and 52 and if the aircraft thereafter deviates in its longitudinal course from the altitude corresponding to the pressure at which the fringe pattern was set, diaphragm 12 is moved and displaces said interference fringe pattern. If the fringes move in the direction of plate 29, for example, light fringe 16a strikes plate 29 and actuates photo-electric cell 29a to energize relay 31, thereby operating switch 44 to close the circuit through contacts 45 and 46. This causes motor 48 to operate and actuate steering device 50 so that the latter moves the control surfaces in a direction which will return the aircraft to the desired constant pressure level and will again locate light fringe 16a between plates 29 and 30.

If the altitude change occurs in the opposite direction, the fringes 16 are moved thereby in the direction of plate 30 instead of plate 29, and photo-electric cell 30a actuates control device 50 by means of relay 42, which closes the motor circuit through contacts 46 and 47 and operates motor 48 in a reverse direction to bring the aircraft back to the constant pressure level.

It is to be noted that the above-described novel apparatus responds almost instantaneously to pressure variations and acts to control motor 48 with substantially no lag or lost motion so that if any lag in the responsiveness of the system is desired it can be accurately introduced in the connection between motor 48 and the aircraft control surfaces. Any pressure responsive means can be utilized in the present invention provided that said means are adapted to almost instantaneously react to changes in pressure of the surrounding medium in a suitable manner, as, for example, by the movement of a part of the mechanism, and the fact that the responsive movement is very small does not affect the successful operation of the automatic control system. The interferometric means in this system are adapted to convert the slightest movement of the pressure responsive mechanism into a corresponding movement of light beams or fringes, and the latter, in turn, by the movement thereof are adapted to instantaneously actuate light responsive circuits connected to power means for setting the aircraft steering controls into operation. Thus, sensitive and accurate means constitute the several parts of the novel automatic pilot of the present invention whereby the flight of an aircraft may be accurately maintained at an atmospheric level having a predetermined pressure.

It has been determined that in an area of flight equal to the area usually covered during bombing, a constant atmospheric pressure exists at any given altitude whenever atmospheric conditions are of a kind permitting the use of automatic pilots. Accordingly, an aircraft flying at a level of constant pressure is in substantially horizontal flight and in a plane parallel to the earth's surface. Therefore, when an aircraft is automatically controlled according to the method of the present invention, the horizontal position thereof is satisfactory to permit bombing operations to be carried on with great accuracy. Furthermore, the automatic control means of the present invention can be used as an automatic pilot to control the longitudinal position of an aircraft during long distance flights without the necessity for manual adjustments by the human pilot.

Although only a single embodiment of the invention has been illustrated and described, it is to be expressly understood that the same is not limited thereto. For example, it will now be apparent to those skilled in the art that diaphragm 12 could be actuated by the difference in pressure between two selected points along the horizontal or lateral axis of an aircraft in order to maintain said points in the same horizontal plane. Interferometrc means operable to produce movements of interference fringes in response to pressure changes without the use of a diaphragm, as, for example, the means disclosed in my copending application Ser. No. 170,155, filed October 21, 1937, now Patent No. 2,256,804, September 23, 1941, could also be utilized to actuate the light responsive means. Furthermore, various well-known light responsive devices and circuits could be utilized in addition to the types illustrated in the drawing to actuate the aircraft control mechanism. Various other changes may be made in the design and arrangement of parts without departing from the spirit and scope of the invention. For a definition of the invention, reference will be primarily had to the appended claims.

What is claimed is:

1. In an aircraft having reversible power means for operating the aircraft controls interferometric means responsive to atmospheric pressure changes, and light sensitive means adapted to be energized by said interferometric means for controlling the operation of said power means in accordance with said pressure changes, the direction of operation of said power means being determined by the direction of the change in pressure from a predetermined mean pressure.

2. In a control device having pressure responsive apparatus and reversible power means, means for controlling the operation of said power means in accordance with pressure variations detected by said apparatus, said second-named means comprising interferometric means for producing interference fringes and light sensitive means adapted to be energized upon movement of said fringes from a predetermined mean position in accordance with said pressure variations.

3. In apparatus wherein an aneroid barometer controls reversible motor means connected to the elevator controls of an aircraft in accordance with the direction of displacement of the diaphragm of the barometer, an interferometric system including an element fixed to said diaphragm in such a manner that the interference fringes created by said system are moved in accordance with the displacement of said diaphragm, light responsive means comprising a pair of light sensitive cells interposed in the path of said fringes so that movement of the fringes in one direction from a predetermined mean position energizes one of said cells and movement of the fringes in the other direction from said mean position energizes the other of said cells, and means controlled by said cells for controlling said motor means to set the latter in operation in one direction upon energization of one of said cells and in the other direction upon energization of the other of said cells.

4. In control apparatus, an aneroid barometer including a diaphragm, an interferometric system including a light reflecting member mounted on said diaphragm whereby the interference fringes created by said system are movable in accordance with the displacement of said diaphragm, and light responsive means comprising a pair of light sensitive cells interposed in the path of said fringes so that movement of the fringes in one direction from a predetermined mean position energizes one of said cells and movement of the fringes in the other direction from said mean position energizes the other of said cells.

5. Control apparatus comprising pressure responsive means, interferometric means adapted to produce interference fringes, said last-named means being so associated with said pressure responsive means that said fringes are caused to move in opposite directions in response to changes in pressure, the direction of movement thereof depending upon whether the pressure rises above or falls below a predetermined mean pressure, light sensitive means for detecting the direction of movement of said fringes, and a pair of electrical circuits controlled by said light sensitive means, said circuits being selectively energized in accordance with the direction of movement of said fringes from a predetermined mean position.

6. Control apparatus comprising pressure responsive means, interferometric means adapted to produce interference fringes, said last-named means being so associated with said pressure responsive means that said fringes are caused to move in opposite directions in response to changes in pressure, the direction of movement thereof depending upon whether the pressure rises or falls, light sensitive means for detecting the direction of movement of said fringes from a predetermined mean position, a pair of electrical circuits controlled by said light sensitive means, said circuits being selectively energized in accordance with the direction of movement of said fringes from said mean position, a reversible motor, and means controlled by said circuits for energizing said motor for operation in one direction or the other depending upon which of said circuits is energized.

7. In control apparatus of the class described, means including interferometric means for detecting variations in atmospheric pressure from a predetermined mean pressure, a pair of electric circuits each including thermionic valve means, and light sensitive means controlled by said first-named means for controlling the operation of said valve means whereby the latter are selectively rendered operative to close one or the other of said circuits depending upon whether the pressure rises above or falls below said mean pressure.

8. In control apparatus of the class described, means including interferometric means for detecting variations in atmospheric pressure from a predetermined mean pressure, a pair of electric circuits each including thermionic valve means, light sensitive means controlled by said first-named means for controlling the operation of said valve means whereby the latter are selectively rendered operative to close one or the other of said circuits, depending upon whether the pressure rises above or falls below said mean pressure, reversible power means, and means controlled by said circuits for determining the direction of operation of said power means.

9. In control apparatus of the class described, means including interferometric means for producing interference fringes movable in accordance with changes in atmospheric pressure, light sensitive means operative for detecting the direction of movement of said fringes from a predetermined mean position, power means, and means controlled by said light sensitive means for selectively energizing said power means in accordance with the direction of movement of said fringes from said mean position.

10. In control apparatus, means including interferometric means for producing interference fringes movable in opposite directions in accordance with changes in atmospheric pressure, the direction of movement of said fringes being dependent upon whether the pressure rises or falls, light sensitive means operative for detecting the direction of movement of said fringes from a predetermined mean position, and a pair of electrical circuits, said circuits including means controlled by said light sensitive means for selectively energizing said circuits in accordance with the direction of movement of said fringes from said predetermined mean position.

11. In control apparatus of the class described, means including interferometric means for producing interference fringes movable in opposite directions from a predetermined mean position in accordance with changes in atmospheric pressure from a predetermined mean pressure, light sensitive means operative for detecting the direction of movement of said fringes from said mean position, reversible power means, and means controlled by said light sensitive means for selectively energizing said power means for operation in one direction or the other depending upon whether the existing pressure is above or below said mean pressure.

12. In control apparatus of the class described, means including pressure responsive means and interferometric means for producing interference fringes movable in opposite directions in response to variations in atmospheric pressure, the direction of movement of said fringes depending upon whether the pressure rises or falls, and light sensitive means adapted to detect the direction of movement of said fringes from a predetermined mean position.

13. In an aircraft control apparatus of the type having a diaphragm actuated by atmospheric pressure changes and reversible power means operatively connected to the controls of the aircraft, interferometric means comprising an element mounted on said diaphragm, said interferometric means being adapted to produce fringes movable in accordance with the motion of said diaphragm, and light sensitive means associated with said interferometric means and energized upon movement of said fringes from a predetermined mean position to control the operation of said reversible power means in accordance with the direction of movement of said fringes from said mean position.

14. In apparatus of the class described, an evacuated chamber, a metal diaphragm forming a closure for said chamber, a mirrored plate secured to the central outer surface of said diaphragm, a light transmitting semi-mirrored plate adjustably mounted adjacent said mirrored plate, the upper and lower surfaces of said semi-mirrored plate being angularly disposed relative to each other, a light source, means for directing a beam from said source onto said plates, a ground plate, and means for directing interference fringes resulting from the recombined beam reflected from said first two plates onto said ground plate.

15. Apparatus for controlling the horizontal flight of an aircraft of the type having an aircraft control surface operatively connected to an aneroid barometer, comprising a mirrored plate secured to the outer surface of the diaphragm of said barometer, a light transmitting, semi-mirrored plate mounted adjacent said mirrored plate, the upper and lower surfaces of the semi-mirrored plate being angularly disposed relative to each other, a light source, means for directing a beam from said source onto said plates, a ground plate, means for directing interference fringes from said first and second named plates onto the ground plate, photo-electric cells positioned in the path of said fringes on said ground plate, and actuating means interposed between said photo-electric cells and said control surface for moving said control surface in accordance with the movement of the diaphragm.

ROY T. HURLEY.